United States Patent [19]

Mullersman et al.

[11] 4,229,686

[45] Oct. 21, 1980

[54] BATTERY CHARGER ADAPTER SYSTEM

[75] Inventors: Ferdinand H. Mullersman; Billy E. Stillwell, both of Gainesville, Fla.

[73] Assignee: General Electric Company, Gainesville, Fla.

[21] Appl. No.: 877,297

[22] Filed: Feb. 13, 1978

[51] Int. Cl.³ .......................................... H01M 10/46
[52] U.S. Cl. ...................................... 320/2; 339/228; 429/1; 429/121
[58] Field of Search .................... 320/2, 3, 4, 5, 6, 25, 320/35; 429/1, 7–9, 96, 97, 100, 121, 163; 339/184 M, 278 M, 29 B, 228, 256 R, 256 RT, 258 R, 258 A

[56] References Cited

U.S. PATENT DOCUMENTS

| | | |
|---|---|---|
| 1,075,556 | 10/1913 | Fendoughty . |
| 1,487,430 | 3/1924 | Balderston . |
| 1,627,264 | 5/1927 | Baird . |
| 2,431,116 | 11/1947 | Grover . |
| 2,649,493 | 8/1953 | Temple . |
| 2,876,410 | 3/1959 | Fry . |
| 2,982,849 | 5/1961 | Volkerling et al. |
| 3,056,850 | 10/1962 | Rauske et al. |
| 3,256,474 | 6/1966 | Englund, Jr. |
| 3,329,881 | 7/1967 | Tolmie . |
| 3,347,709 | 10/1967 | Taylor et al. |
| 3,435,318 | 3/1969 | Mas . |
| 3,440,105 | 4/1969 | Yamamoto et al. |
| 3,518,524 | 6/1970 | Roszyk . |
| 3,665,285 | 5/1972 | Mullersman et al. |
| 3,684,583 | 8/1972 | Lehnen et al. |
| 3,696,283 | 10/1972 | Ackley . |
| 3,735,232 | 5/1973 | Fister . |
| 3,752,705 | 8/1973 | Pensabene . |
| 3,969,148 | 7/1976 | Trattner . |
| 3,977,907 | 8/1976 | Roth et al. . |
| 3,980,388 | 9/1976 | Nailor ........................... 339/256 RT |
| 3,986,894 | 10/1976 | Ciliberti, Jr. |
| 3,990,919 | 11/1976 | Krueger . |
| 4,009,429 | 2/1977 | Mullersman ........................ 320/6 X |
| 4,084,037 | 4/1978 | Morton .................................. 429 1/ |

FOREIGN PATENT DOCUMENTS 887290  11/1971  Canada .

Primary Examiner—Robert J. Hickey
Attorney, Agent, or Firm—Morgan, Finnegan, Pine, Foley & Lee

[57] ABSTRACT

A charging system for rechargeable batteries of the 9 volt type includes a charger adapted to accept a plurality of cells of different sizes and electrical characteristics and an adapter module for mechanically and electrically interconnecting the charger to a 9 volt size battery.

19 Claims, 19 Drawing Figures

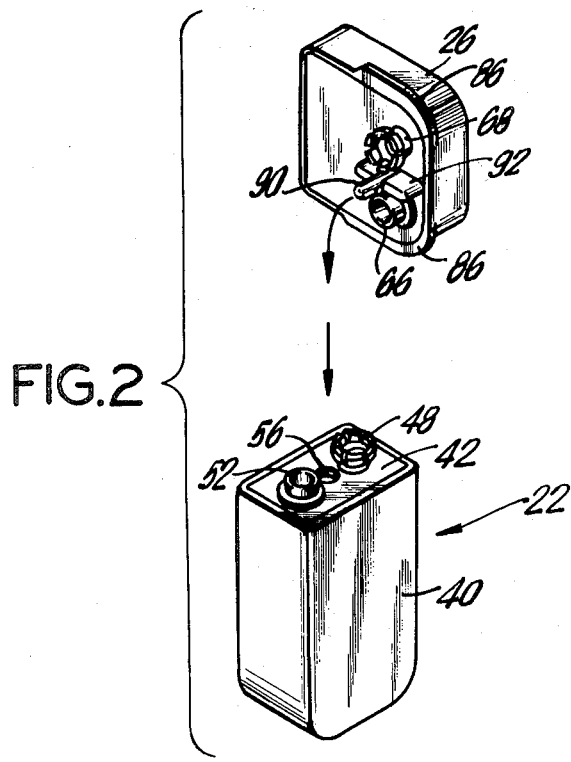
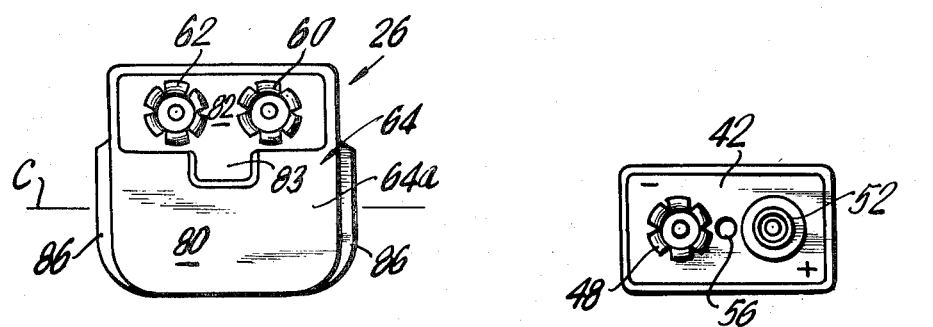
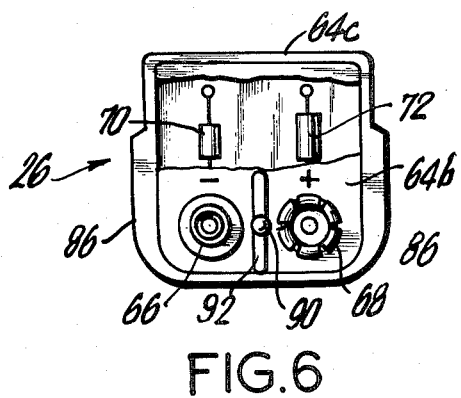
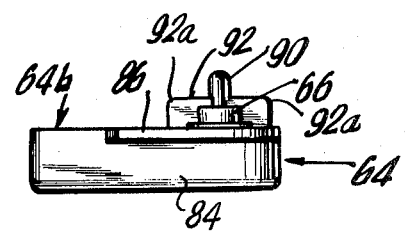
FIG.2
FIG.5
FIG.4
FIG.6
FIG.7

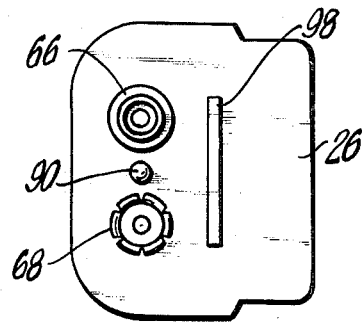
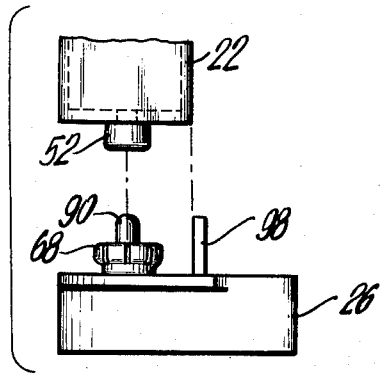
FIG.8　　　　FIG.9
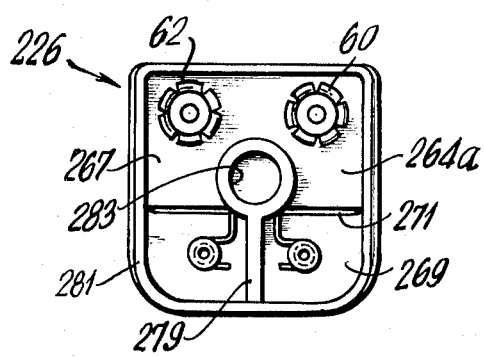
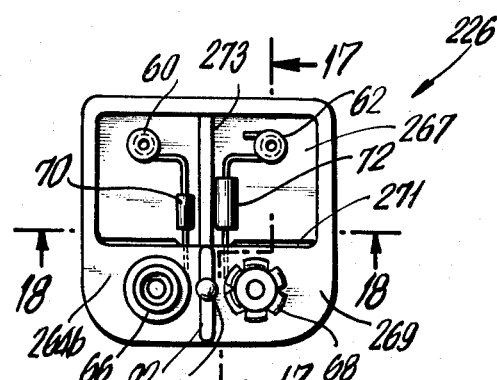
FIG.15　　　　FIG.16
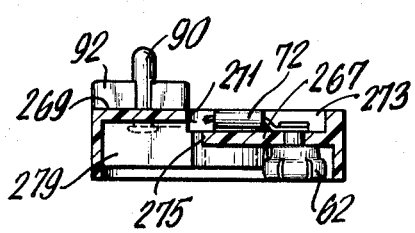
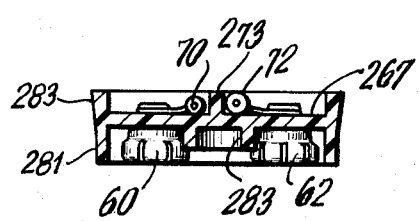
FIG.17　　　　FIG.18

BATTERY CHARGER ADAPTER SYSTEM

CROSS REFERENCE TO RELATED APPLICATIONS

This application is related to the following commonly assigned applications filed contemporaneously herewith: Ser. No. 878,453, filed Feb. 16, 1978; Ser. No. 877,281, filed Feb. 13, 1978; Ser. No. 877,299, filed Feb. 13, 1978.

BACKGROUND OF THE INVENTION

This invention relates to rechargeable batteries and more particularly to a simple, inexpensive, charging system whereby a rechargeable battery of the 9 volt physical size and/or electrical characteristics are selectively and alternatively connectible to a charge current source for recharging of the type described in U.S. Pat. No. 4,009,429.

There is an increasing number of consumer products being operated by rechargeable cells such as nickel-cadmium cells. These products require cells with a plurality of physical sizes and electrical characteristics. The variety of cell types in wide use in the consumer market has given rise to the need to provide a unitary charging device to accommodate the various cell types. One such device is described in U.S. Pat. No. 3,579,075 issued on May 18, 1971 and assigned to the assignee of the invention herein. While this device provides a viable approach for charging cells of a variety of types, it has failed to achieve widespread adoption in the consumer market because of its complexity and cost of construction. The system described in the above-identified U.S. Pat. No. 4,009,429 is useful in charging AA, C & D size batteries, but does not accept 9 volt size batteries.

SUMMARY

The present invention is an improvement on the system described in U.S. Pat. No. 4,009,429 whereby 9 volt size batteries may be charged.

The system of this invention utilizes in combination a transformer and 9 volt size battery which are interconnected by an adapter module. The adapter is designed to mechanically and electrically join the battery to the transformer so that a highly compact system results. Electric means such as diodes and resistors are carried by the adapter to adapt the charger characteristics to those useful for the 9 volt battery. Thus, the usefulness of the charger system is expanded to include 9 volt size batteries.

BRIEF DESCRIPTION OF THE DRAWINGS

FIG. 2 is an exploded, perspective view of a 9 volt size battery and adapter with the adapter rotated 90°;

FIG. 4 is an end view of the battery of FIG. 3;

FIG. 5 is a bottom plan view of the adapter;

FIG. 6 is a top plan view of the adapter with certain portions broken away for clarity of illustration;

FIG. 7 is a side elevation view of the adapter;

FIG. 8 is a top plan view of an alternative adapter with a battery alignment wall;

FIG. 9 is a side elevation view of the adapter of FIG. 8 and part of a 9 volt battery illustrating the operation of the alignment wall;

FIGS. 15 and 16 are bottom and top plan views of a third alternative adapter;

FIGS. 17 and 18 are cross-sectional views taken along lines 17—17 and 18—18, respectively, in FIG. 16;

DETAILED DESCRIPTION

Figure 1:
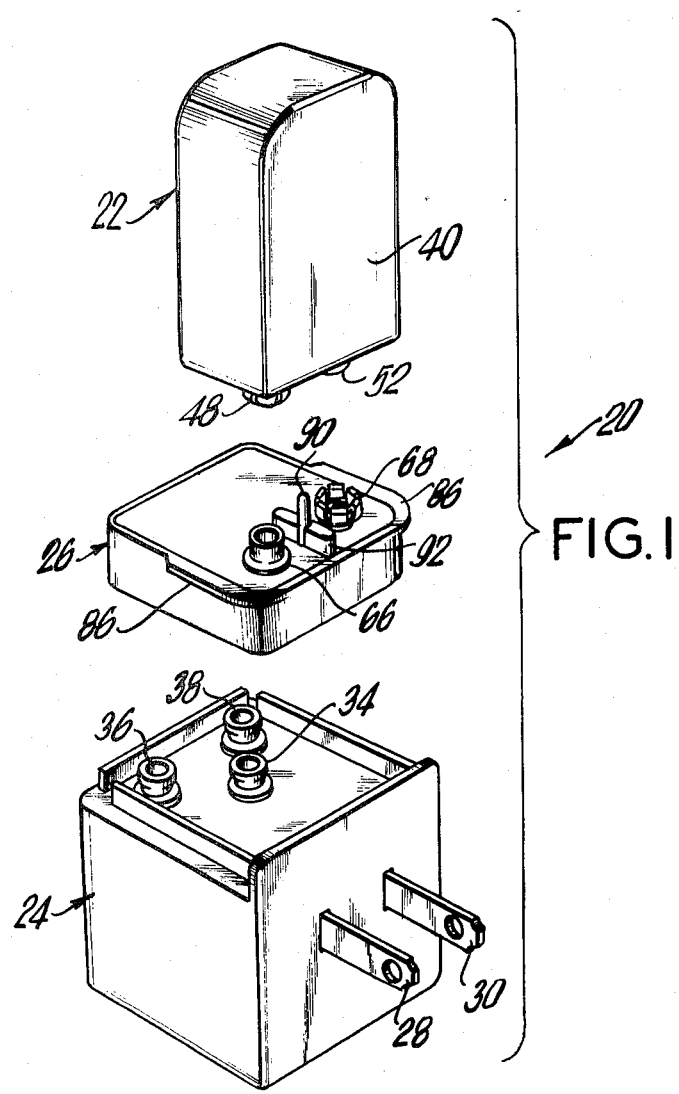
FIG. 1 is an exploded, perspective view of a charge current source, an adapter and a 9 volt battery of the present invention.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

The overall system 20 is shown in FIG. 1. System 20 includes a rechargeable battery 22, a source 24 and an adapter 26. FIG. 1 is an exploded perspective view of the components of the system when assembled for charging.

The Charge Source

Figure 19:
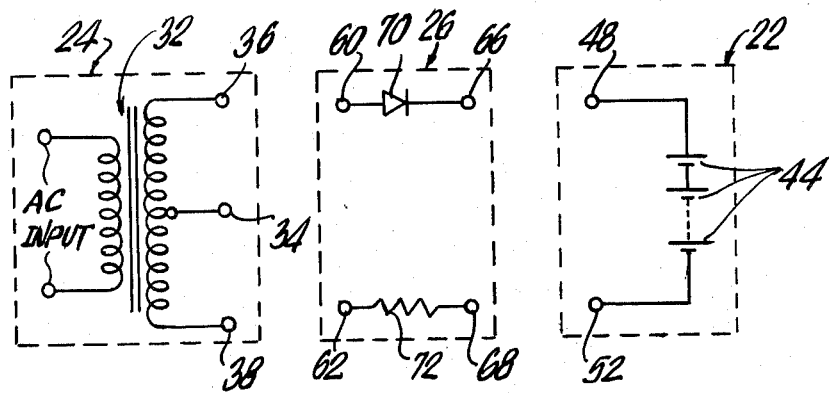
FIG. 19 is a circuit diagram of the charger, adapter, and battery.

The charge current source 24 is comprised of a conventional high impedance center tapped transformer, which is illustrated schematically in FIG. 19 by block 24. Two blades 28, 30 are provided in one face of the charger housing for connection to a source of 120 VAC. Source 24 is available commercially from the assignee, General Electric Company, under the designation BC3 miniature charger, and is described in the above-identified U.S. Pat. No. 4,009,429.

As shown in FIG. 19, the source 24 comprises a transformer 32 to make available from the standard 110–120 volt cycle AC line an output current of appropriate magnitude for the load provided. Terminal 34 is centrally tapped to the secondary of transformer 32, while terminals 36 and 38 are end tapped to the secondary of the transformer.

As shown in FIG. 1, terminals 34, 36 and 38 are one-way, snap-type "male" terminals attached to a face of source 24.

The Rechargeable Battery

Figure 3:
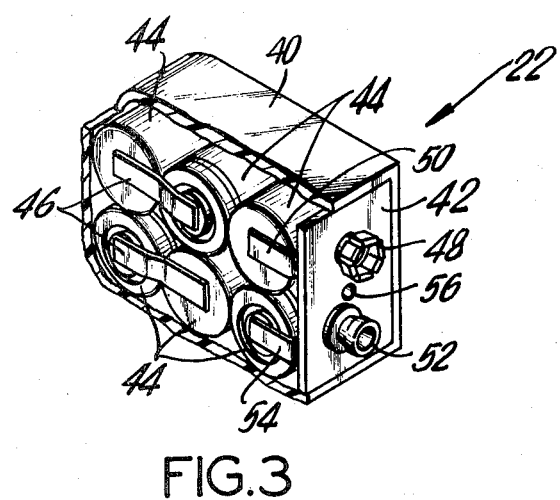
FIG. 3 is a perspective view of a 9 volt size battery with portions broken away for clarity of illustration.
Figure 10:
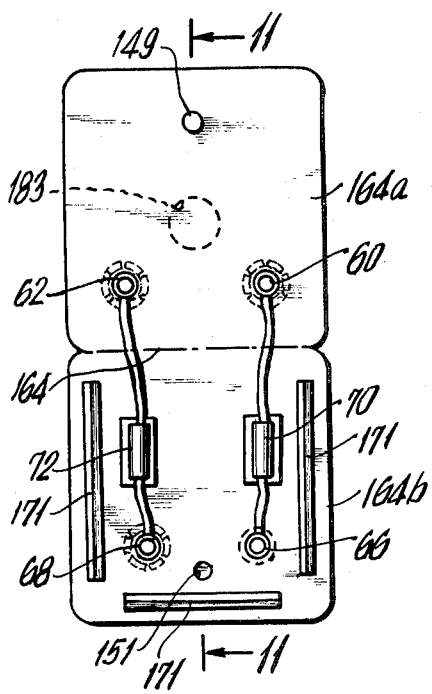
FIG. 10 is a plan view of a second alternative adapter in the open position.
Figure 11:
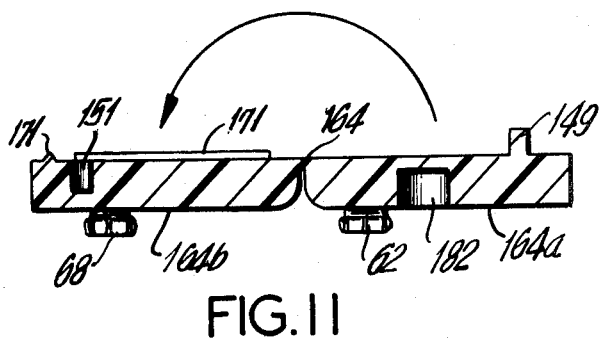
FIG. 11 is a cross-sectional view taken along line 11—11 in FIG. 10.
Figure 12:
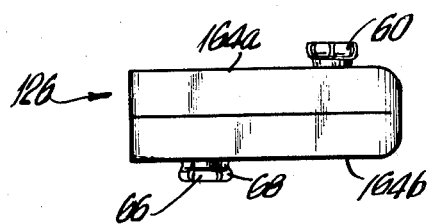
FIG. 12 is a side elevation view of the adapter of FIG. 10 in the assembled position.

Rechargeable battery 22, FIG. 3, includes a generally rectangular shaped housing 40 which is open at one end and closure end plate 42 which may be formed of an insulating plastic material such as polystyrene. End plate 42 is joined to housing 40 by means of adhesive or ultrasonic welding techniques.

Battery 22 is sized for 9 volt usage in its physical dimensions and includes 6 rechargeable nickel cadmium cells 44 having a nominal voltage of 1.25 V.D.C. The cells 44 are connected in series by conductive straps 46 (only two are illustrated).

The first cell 44 is connected to a female one-way snap terminal 48 carried on end plate 42 by conductive strip 50. The last cell 44 of the series is connected to a male one-way snap terminal 52 by conductive strap 54 to complete the electrical circuit of the battery, as shown in FIG. 19.

Since battery 22 is rechargeable and of the physical size of ordinary non-rechargeable 9 volt batteries, it is preferred to have security means on the battery which cooperate with adapter 26 to permit only rechargeable battery to be used therewith. To this end an aperture 56 is provided in end plate 42 between the terminals 48 and 52, see FIG. 4. As described below, this aperture 56 allows battery 22 to be attached to adapter 26, but not ordinary batteries.

The Adapter

Adapter 26 is the bridging element between source 24 and battery 22 and serves two functions; namely, physically attaching or mounting the battery and electrically connecting the terminals 36 and 38 of the charger to terminals 48 and 52 of the battery.

To these ends, adapter 26 includes a pair of one-way female snap terminals 60, 62 attached to one surface of housing 64, see FIG. 5, which interconnect with charger terminals 36 and 38, and on an opposite surface a second set of one-way snap terminals, a male terminal 66 and female terminal 68, FIG. 6, which interconnect with battery terminals 48 and 52, respectively. The one-way snap type terminal not only provides electrical contact but also mechanical gripping to support the battery on the charger.

Electrical circuitry is carried by the adapter to provide suitable conditioning of the source to battery characteristic by current and voltage current. To this end rectifying means, particularly a half-way rectifier 70, such as a diode, is connected between terminals 60 and 66 and a resistor 72 is connected between terminal 62 and 68 to produce the circuit shown in FIG. 19. It will be appreciated by those skilled in the art that other arrangements of electrical components may also be utilized to provide suitable conditioning of the source to the battery.

Adapter housing 64 is preferably of a molded plastic construction and may be fabricated in a number of methods and configurations as described herein. The adapter housing shown in FIGS. 5–7 has a fully enclosed structure formed by a housing portion 64a and closure portion 64b. Portion 64a and 64b may be separately molded pieces of integrally joined by a hinge 64c.

Housing portion 64a includes a contoured bottom surface. Bottom surface as used herein refers to the surface which abuts against the charger, and top surface refers to the surface of the adapter which abuts against the battery when the system components are assembled for charging, FIG. 1. The contoured bottom, FIG. 5, contains a flat portion 80 and a recessed portion 82 wherein terminals 60 and 62 are located. Recessed portion 82 also includes a clearance area 83 to receive terminal 34 therein when the adapter 26 is positioned on charger 24. Side walls 84 extend upwardly from bottom surface 80 to define an internal cavity for receipt of diode 70 and resistor 72.

Closure portion 64b has a generally flat surface and carries terminals 66 and 68 thereon. Portion 64b is joined to portion 64a by the use of adhesive or ultrasonic bonding techniques.

Finger Grips

A pair of laterally extending finger grips 86 are provided at the top edge of portion 64a. Grips 86 are positioned such that their centers, shown by line C, are offset from the center line of terminals 60 and 62. In this manner, when the grips 86 are manually grasped and pulled, a moment or torque about terminals 60 and 62 is produced to facilitate removal of the adapter from the charger terminals 36 and 38.

Adapter Safety Interface

As discussed above, only rechargeable batteries can be utilized in the system. To cooperate with the aperture 56 in end plate 42 of the battery, an index means or key in the form of an upwardly extending projection 90 is provided on adapter 26 between terminals 66 and 68.

As best illustrated in FIG. 2, when the terminals of battery 22 are snap-fitted to the terminals of adapter 26, key 90 passes through aperture 56. It will be appreciated that the combination of aperture 56 and key 90 function to allow only rechargeable batteries of the type shown in FIG. 4 to be connected since projection 90 will contact the end plate of nonconforming batteries and prevent their connection to the adapter.

Since terminals 66, 68 and 48, 52 are snap type, it is advantageous to provide battery removal assist means to the adapter 26. To this end, upstanding fulcrum or wall 92 is provided between terminals 66 and 68. Wall 92 is equidistant and perpendicular to the terminal centerlines and of a height such that the battery terminal may be attached to the charger terminals and the top surface of wall 92 abuts against end plate 42. In this manner, when the battery is to be removed from the adapter, it is pivoted in the plane of wall 92 so that one of the top end edges 92a act as a fulcrum to assist in separating the battery from the adapter.

Adapter With Battery Alignment Means

In order to avoid damage to the terminals of the battery 22 and adapter 26 arising from continual interconnection, it is advantageous to provide means for accurately aligning the respective terminals prior to engagement. To this end, the adapter 26, FIGS. 8 and 9, includes a safety key 90 of the type described above and an upstanding alignment wall 98. Wall 98 is parallel to the centerline of terminals 66 and 68 and spaced therefrom a distance sufficient to contact and guide the side of the battery 22 into terminal engagement. The combination of key 90 and wall 98 thereby functions to accurately align terminals 66 and 68 with terminals 48 and 52 during mating and militate against damage thereto from repeated mating.

Alternative Adapters

FIGS. 10–14 illustrate another form of adapter 126 formed of two injection mold portions; namely, a bottom portion 164a and a top portion 164b, which are joined by a hinge 164c.

Figure 13:
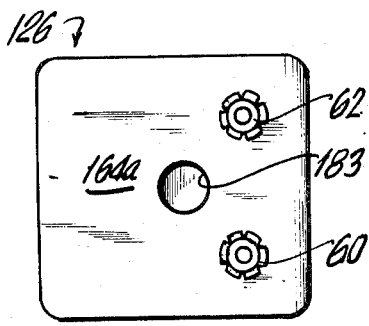
FIGS. 13 and 14 are bottom and top plan views of the adapter of FIG. 12.

The outer surface of bottom portion 164a, FIG. 13, carries charger terminals 60 and 62 and has a clearance area 183 for receipt of charger terminal 34. The interior surface of bottom portion 164a includes a molded locater projection 149, which mates with locater aperture 151 when the adapter is folded about hinge 164.

Figure 14:
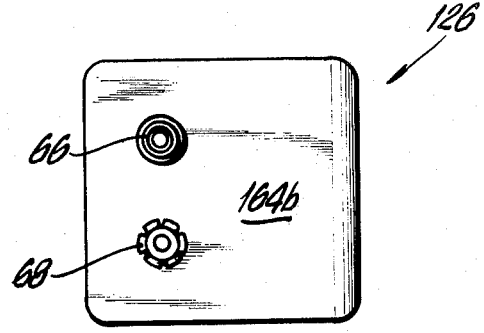

The outer surface of top portion 164b, FIG. 14, carries battery terminals 66 and 68. The inner surface includes cavities for receipt of diode 70 and resistor 72 and energy concentrator ridges 171. After the terminals, diode and resistor have been assembled on the adapter in the open position, FIGS. 10 and 11, the portion 164a is folded about hinge 164 to place the inner surfaces in abutting relationship and ultrasonic welding is performed with the aid of concentrator 171 to bond the adapter in the folded configuration shown in FIG. 12.

Another form of adapter 226 is illustrated in FIGS. 15-18. Adapter 226 is a single injection molded element which is formed with contoured compartments. The one piece adapter body includes a first horizontal support element 267, which carries terminals 60 and 62 on one surface and diode 70 and resistor 72 on the opposite surface. A second horizontal support element 269 is spaced upwardly from element 267, see FIG. 17, and defines a gap between its end edge 271 and the end edge 275 of element 267. Element 269 carries terminals 66 and 68 as well as having formed thereon key 90 and fulcrum wall 92.

With particular reference to FIGS. 16 and 18, the diode 70 circuit and resistor 72 circuits are isolated by means of a longitudinally extending wall 273 on the top surface of element 267. The resistor and diode are positioned and held against the surfaces of wall 273 and element 267 at the corner junction thereof. The lead wires pass through the gap between end edges 271 and 275.

The diode 70 and resistor 72 lead wires are also separated on element 269 by a longitudinal wall 279, FIG. 15, which joins with a circular receiving wall 283 for charger terminal 34.

The entire bottom periphery of the adapter is surmounted by a wall 281 and the top surface of element 267 is surmounted by a peripheral wall 283 to produce a side enclosed adapter as shown in FIG. 18. Advantageously, the longitudinal sections of wall 283 taper outwardly and are textured to facilitate manual gripping.

These and other modifications may be made to the invention without departing from the scope and spirit thereof as pointed out in the appended claims.

What is claimed is:

1. In a charging system for secondary batteries having a housing containing a source of charge current including a secondary winding with first, second and third source terminals, said first and third source terminals connected to said winding, said second source terminal connected to said winding at a point intermediate of the connections of said first and third source terminals to said winding; and a secondary battery having positive and negative terminals, the improvement comprising: an adapter module comprising housing means having first and second terminals removably connectable to said first and third source terminals and having third and fourth terminals removably connectable to said positive and negative battery terminals, means electrically interconnecting said first and second adapter terminals with said third and fourth adapter terminals, respectively, and means for detachably securing said adapter housing means to said source housing and said battery.

2. The charging system of claim 1, wherein said battery is a multiple cell battery.

3. The charging system of claim 1, wherein said securing means include snap element connected to said terminals whereby both electrical contact and mechanical support for the battery are provided thereby.

4. The charging system of claim 1, wherein said adapter includes current limiting means.

5. The charging system of claim 1, wherein said adapter includes rectification means.

6. The charging system of claim 5, wherein said rectification means is carried internally of the adapter housing.

7. The charging system of claim 1, wherein said source housing includes a recess, the source terminals being located in said recess, and wherein the adapter housing is dimensioned to be received within said recess.

8. A battery charging adapter for converting a multiple output terminal source into a dual terminal source, comprising: housing means; first and second contact means extending from said housing for electrically and mechanically engaging selected ones of said multiple terminals, and third and fourth contact means extending from said housing means for electrically and mechanically engaging the terminals of a rechargeable battery so as to support the battery from said contact means when said first and second contact means engage said selected multiple output terminals; means electrically interconnecting said first and third and said second and fourth contact means.

9. A charging adapter of claim 8, wherein said contact means are snap-type contacts.

10. A charging adapter of claim 8, wherein said third and fourth contact means are positioned to accept the terminals of a multiple cell battery.

11. A charging adapter of claim 8, wherein said adapter includes rectification means.

12. A charging adapter of claim 11, wherein said rectification means is a diode.

13. A charging adapter of claim 8, wherein said rectification means is connected between said first and third contact means.

14. A charging adapter of claim 8, wherein said adapter includes currect limiting means.

15. A charging adapter of claim 14, wherein said current limiting means is connected between said second and fourth contact means.

16. A battery charging adapter for connection between a charging source and a battery, comprising housing means having first and second opposite major surfaces, first and second snaptype terminal contacts extending from one major surface and third and fourth snap-type terminals extending from the other of said major surfaces; means within said housing means electrically connecting said first contact with said third contact and said second contact with said fourth contact, said connecting means including current rectification means.

17. A charging adapter of claim 16, wherein said rectification means is connected between said first and third contacts.

18. A charging adapter of claim 17, further comprising a current limiting resistor connected between said second and fourth contacts.

19. A charging adapter of claim 17, wherein said rectification means is a diode.

* * * * *